United States Patent
Im et al.

(10) Patent No.: US 11,628,764 B2
(45) Date of Patent: Apr. 18, 2023

(54) LAMP SYSTEM FOR TRAFFIC LANE INDICATION USING NAVIGATION LINK AND METHOD FOR TRAFFIC LANE INDICATION THEREOF

(71) Applicant: HYUNDAI MOBIS CO., LTD., Seoul (KR)

(72) Inventors: Soo Han Im, Yongin-si (KR); Eun Hee Kim, Yongin-si (KR); Jong Su Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 121 days.

(21) Appl. No.: 17/167,177

(22) Filed: Feb. 4, 2021

(65) Prior Publication Data
US 2021/0237641 A1    Aug. 5, 2021

(30) Foreign Application Priority Data
Feb. 5, 2020  (KR) ......................... 10-2020-0013561

(51) Int. Cl.
*B60Q 1/26* (2006.01)
*B60Q 1/50* (2006.01)
*B60Q 1/20* (2006.01)
*B60K 35/00* (2006.01)

(52) U.S. Cl.
CPC ............... *B60Q 1/50* (2013.01); *B60K 35/00* (2013.01); *B60Q 1/20* (2013.01); *B60K 2370/1529* (2019.05); *B60K 2370/166* (2019.05); *B60K 2370/178* (2019.05); *B60Q 2400/50* (2013.01)

(58) Field of Classification Search
CPC ........ B60Q 1/50; B60Q 1/20; B60Q 2400/50; B60K 35/00; B60K 2370/1529; B60K 2370/166; B60K 2370/178
See application file for complete search history.

(56) References Cited

U.S. PATENT DOCUMENTS

| | | | |
|---|---|---|---|
| 6,497,297 B1* | 12/2002 | Ebert ........................ | G01D 7/08 701/119 |
| 9,845,043 B1* | 12/2017 | Webb ................ | B60W 50/0098 |
| 10,595,176 B1* | 3/2020 | Gallagher .............. | G08G 1/163 |
| 10,955,855 B1* | 3/2021 | Tran ...................... | G05D 1/0246 |
| 11,238,737 B2* | 2/2022 | Hanafi .................... | G08G 1/166 |
| 2005/0237758 A1* | 10/2005 | Takeda ..................... | B60Q 1/14 362/512 |
| 2014/0159886 A1* | 6/2014 | Hasegawa ............. | B60W 50/14 340/435 |
| 2016/0144896 A1* | 5/2016 | Takahashi .............. | B60K 28/14 701/41 |

(Continued)

*Primary Examiner* — Quang Pham
(74) *Attorney, Agent, or Firm* — H.C. Park & Associates, PLC

(57) ABSTRACT

A lamp system for traffic lane indication using a navigation link may include a multi-function sensor sensing an environment and a line in front of a host vehicle, a line lamp generating and outputting a prediction line at a location corresponding to a line of a road, a navigation device providing location information of the host vehicle, and a vehicle controller predicting a forward line based on a line sensed by the multi-function sensor, and the location information of the host vehicle provided by the navigation device and controlling the line lamp to output the prediction line to follow the predicted forward line.

17 Claims, 9 Drawing Sheets

(56) References Cited

U.S. PATENT DOCUMENTS

| | | | | |
|---|---|---|---|---|
| 2016/0221493 A1* | 8/2016 | Okamoto | ............... | B60Q 1/50 |
| 2017/0054973 A1* | 2/2017 | Kasazumi | ............ | H04N 13/106 |
| 2018/0037216 A1* | 2/2018 | Otake | ................... | B60W 30/12 |
| 2018/0126897 A1* | 5/2018 | Hamada | ................. | B60Q 1/50 |
| 2018/0174467 A1* | 6/2018 | Fukuda | ............... | B62D 15/025 |
| 2018/0181818 A1* | 6/2018 | Shimotani | ................ | G06T 7/70 |
| 2018/0370567 A1* | 12/2018 | Rowell | ............. | B62D 15/0295 |
| 2019/0012912 A1* | 1/2019 | Kim | ................ | G08G 1/096716 |
| 2019/0023273 A1* | 1/2019 | Ishioka | .................... | G08G 1/16 |
| 2019/0031089 A1* | 1/2019 | Kunii | .............. | G08G 1/096791 |
| 2019/0041038 A1* | 2/2019 | White | ................... | B60Q 1/143 |
| 2019/0113925 A1* | 4/2019 | Sim | ................... | G01C 21/3889 |
| 2019/0168666 A1* | 6/2019 | Nomura | ................ | B60K 37/00 |
| 2019/0293936 A1* | 9/2019 | Okayama | ............... | H04N 13/30 |
| 2019/0329708 A1* | 10/2019 | Hakki | ................... | B60Q 9/008 |
| 2020/0047807 A1* | 2/2020 | Kim | .................... | B62D 15/028 |
| 2020/0114933 A1* | 4/2020 | Ono | ............... | B60W 30/18009 |
| 2020/0317113 A1* | 10/2020 | Dingli | .................... | B60Q 1/143 |
| 2021/0237641 A1* | 8/2021 | Im | ........................... | B60Q 1/20 |
| 2022/0169257 A1* | 6/2022 | Kikuta | ................ | B60W 40/08 |
| 2022/0212670 A1* | 7/2022 | Aoki | .................... | B60W 30/16 |

\* cited by examiner

LAMP SYSTEM FOR TRAFFIC LANE INDICATION USING NAVIGATION LINK AND METHOD FOR TRAFFIC LANE INDICATION THEREOF

CROSS-REFERENCE TO RELATED APPLICATION

This application claims priority from and the benefit of Korean Patent Application No. 10-2020-0013561, filed on Feb. 5, 2020, which is hereby incorporated by reference for all purposes as if set forth herein.

BACKGROUND

Field

Exemplary embodiments relate to a lamp system for traffic lane indication using a navigation link and a method for traffic lane indication thereof, and more particularly, relate to a lamp system for traffic lane indication using a navigation link that is capable of identifying a location of a line through a lamp irradiating an actual line on a road surface while a vehicle is driving in bad weather such as fog or heavy rain, thereby reducing the risk of accidents and securing safety, and a method for traffic lane indication thereof.

Discussion of the Background

In general, a vehicle may secure a driver's view by using a head lamp irradiating light forward at night and a fog lamp used in fog and may display a current location and a driving direction of the vehicle by using a navigation device and a head-up display (HUD).

However, even though the head lamp and the fog lamp are turned on when fog is severe, it may be difficult to identify a driving line because visibility is not secured.

In particular, when there is a vehicle in front of the host vehicle, the host vehicle is capable of driving depending on the taillights of the vehicle in front. However, when there is no vehicle in front, it may be impossible for a driver of the host vehicle to determine whether the host vehicle is driving along an actual driving lane. Besides, the host vehicle may be driving across two lanes or may be driving while at least partially occupying an opposite lane, which may result in a severe head-on collision between two vehicles.

In addition, a conventional navigation device and a conventional HUD only provide a notification of a driving direction without displaying an accurate vehicle location or an accurate line location.

The above information disclosed in this Background section is only for enhancement of understanding of the background of the invention and, therefore, it may contain information that does not constitute prior art.

SUMMARY

Exemplary embodiments of the present disclosure has been made to solve the above-mentioned problems occurring in the prior art while advantages achieved by the prior art are maintained intact.

An aspect provides for a lamp system for traffic lane indication using a navigation link that identifies a location of a line through a fog-free lamp irradiating an actual line on a road surface to lower the risk of an accident and to secure safety while a vehicle is driving in bad weather such as fog or heavy rain, allows a driver to detect lane departure through a real-time vehicle location displayed on a HUD by analyzing data of the line irradiated on the road surface when a host vehicle deviates from a line, and provides the driver with a sense of safety by displaying an accurate location of the host vehicle even in fog, and a method for traffic lane indication thereof.

The technical problems to be solved by the present inventive concept are not limited to the aforementioned problems, and any other technical problems not mentioned herein will be clearly understood from the following description by those skilled in the art to which the present disclosure pertains.

According to at least one embodiment, a lamp system for traffic lane indication using a navigation link may include a multi-function sensor sensing an environment and a line in front of a host vehicle, a line lamp generating and outputting a prediction line at a location corresponding to a line of a road, a navigation device providing location information of the host vehicle, and a vehicle controller predicting a forward line based on the line captured sensed by the multi-function sensor and the location information of the host vehicle provided by the navigation device, and controlling the line lamp to output the prediction line to follow the predicted forward line.

In an embodiment, the vehicle controller may control a fog lamp to be turned on when fog is detected through the multi-function sensor.

In an embodiment, the vehicle controller may predict the forward line by analyzing a curvature or a size of the line captured through the multi-function sensor.

In an embodiment, the vehicle controller may output only the line lamp when there is another vehicle that is moving in an opposite direction than a direction in which the host vehicle is moving, or there is another vehicle that is in front of the host vehicle and that is moving in a same direction in which the host vehicle is moving.

In an embodiment, the vehicle controller may cause the prediction line and a location of the host vehicle to be displayed through a HUD in real time.

In an embodiment, the vehicle controller may warn a driver through a warning device when the location of the host vehicle displayed on the HUD in real time deviates from the prediction line displayed on the HUD by at least a predetermined deviation amount.

In an embodiment, the line lamp may use a light source capable of condensing light.

According to another embodiment, a method for traffic lane indication by a lamp system for traffic lane indication using a navigation link may include receiving forward line information through a multi-function sensor sensing an environment and a line in front of a host vehicle, receiving location information of the host vehicle through a navigation device, predicting a forward line based on a line sensed by the multi-function sensor and the location information of the host vehicle provided by the navigation device, and controlling the line lamp to output a prediction line to follow the predicted forward line.

In an embodiment, the receiving of the forward line information may include controlling a fog lamp to be turned on when fog is detected through the multi-function sensor.

In an embodiment, the predicting of the forward line may include predicting a forward line by analyzing a curvature or a size of the line captured through the multi-function sensor.

In an embodiment, the controlling of the line lamp may include outputting only the line lamp when there is another vehicle that is moving in an opposite direction than a direction in which the host vehicle is moving, or there is another vehicle that is in front of the host vehicle and that is moving in a same direction in which the host vehicle is moving.

In an embodiment, the method may further include detecting the prediction line through the multi-function sensor and analyzing a location of the host vehicle based on the detected prediction line and displaying the location of the host vehicle on a HUD, after the controlling of the line lamp.

In an embodiment, the method may further include warning a driver through a warning device when the location of the host vehicle displayed on the HUD in real time deviates from the prediction line displayed on the HUD by at least a predetermined deviation amount, after the controlling of the line lamp.

According to another embodiment, there is provided a lamp system for providing an optimal vehicle path indication, the lamp system including: a multi-function sensor configured to sense an environment and a path directly in front of a host vehicle on which the host path is set to travel on; a line lamp configured to generate and output a prediction line at a location corresponding to a line of a road; a location information device configured to provide location information of the host vehicle; and a vehicle controller configured to: predict a forward line based on the line sensed by the multi-function sensor and the location information of the host vehicle provided by the navigation device; and control the line lamp to output the prediction line to follow the predicted forward line.

In an embodiment, the vehicle controller may control a fog lamp to be turned on when fog is detected through the multi-function sensor.

In an embodiment, the vehicle controller may predict the forward line by analyzing a curvature or a size of the line sensed by the multi-function sensor.

In an embodiment, the vehicle controller may control only the line lamp to be output when there is another vehicle that is moving in an opposite direction than a direction in which the host vehicle is moving, or when there is another vehicle in front of the host vehicle and that is moving in a same direction in which the host vehicle is moving.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
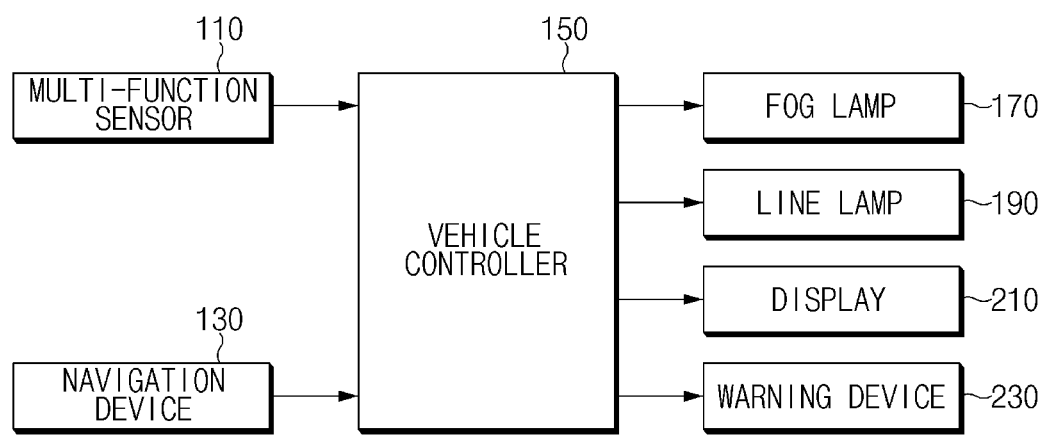
FIG. 1 is a block diagram illustrating a lamp system for traffic lane indication using a navigation link according to an embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Hereinafter, exemplary embodiments will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments will be described in detail with reference to FIGS. 1 to 4.

Figure 2:
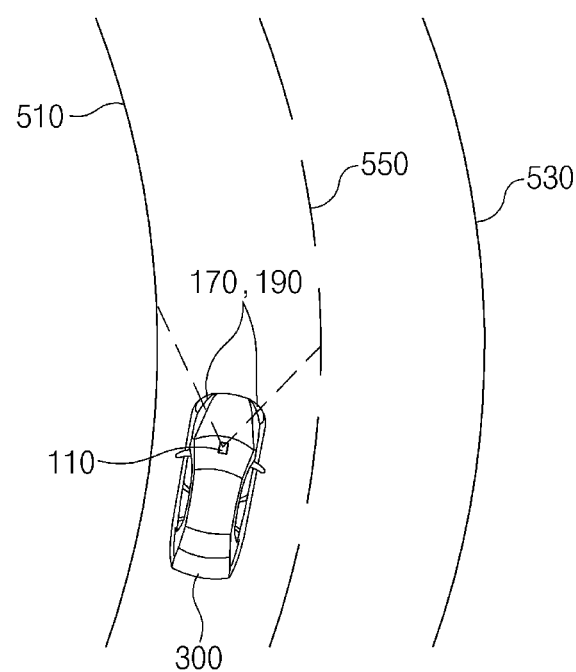
FIG. 2 and FIG. 3 are diagrams for describing a procedure for traffic lane indication by a lamp system for traffic lane indication using a navigation link, according to an embodiment.
Figure 3:
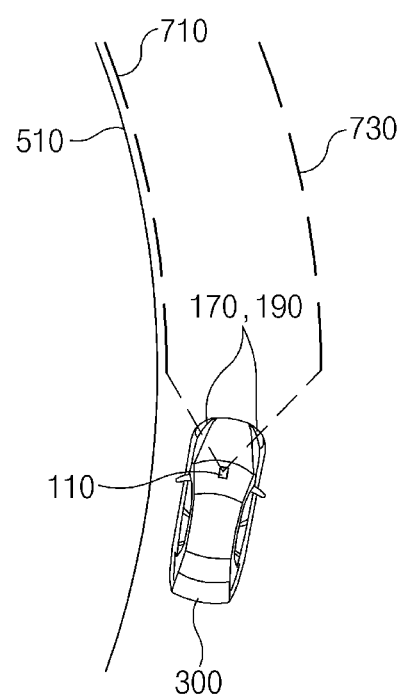
Figure 4:
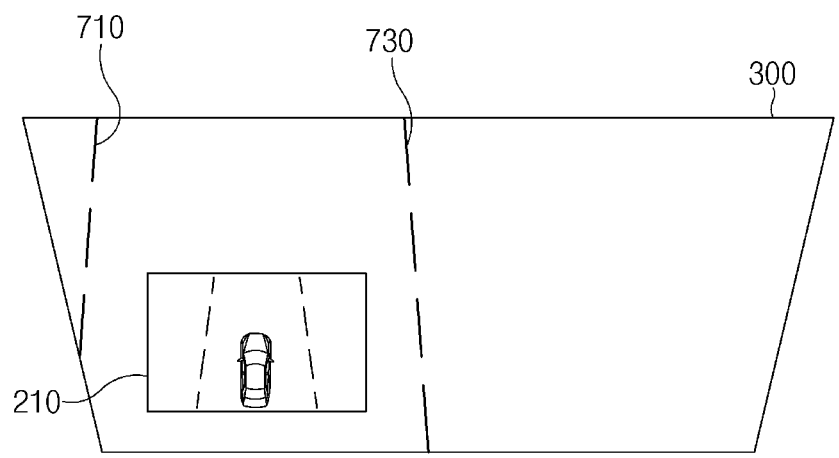
FIG. 4 and FIG. 5 are diagrams for describing a procedure for displaying traffic lane indication on a HUD by a lamp system for traffic lane indication using a navigation link, according to an embodiment.
Figure 5:
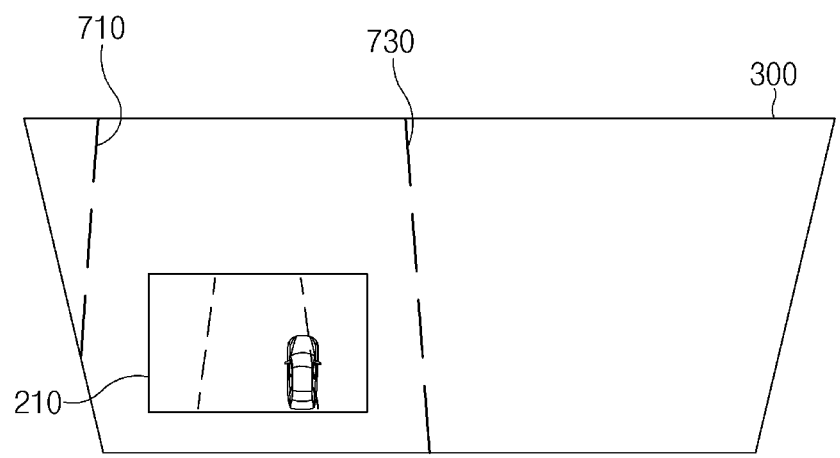
Figure 6:
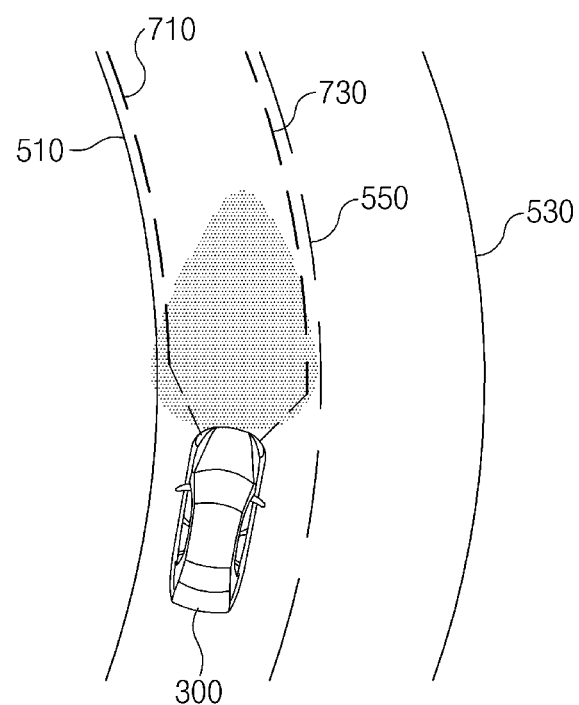
FIGS. 6, 7, and 8 are diagrams for describing a procedure for traffic lane indication after a lane change by a lamp system for traffic lane indication using a navigation link, according to an embodiment.
Figure 7:
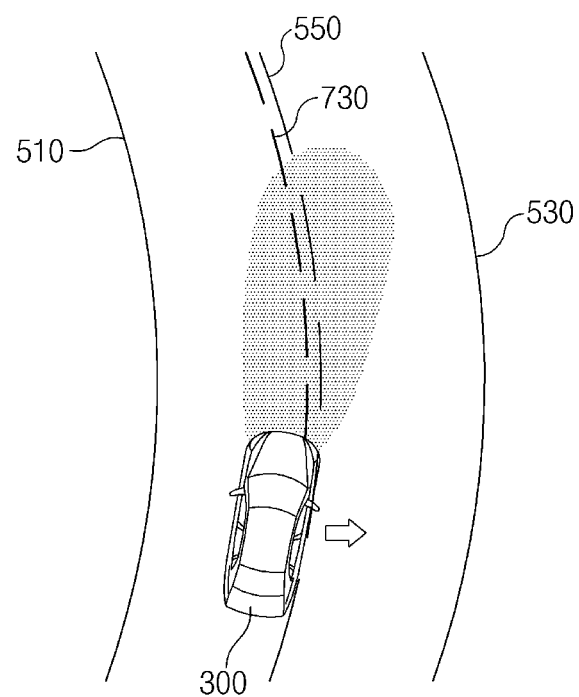
Figure 8:
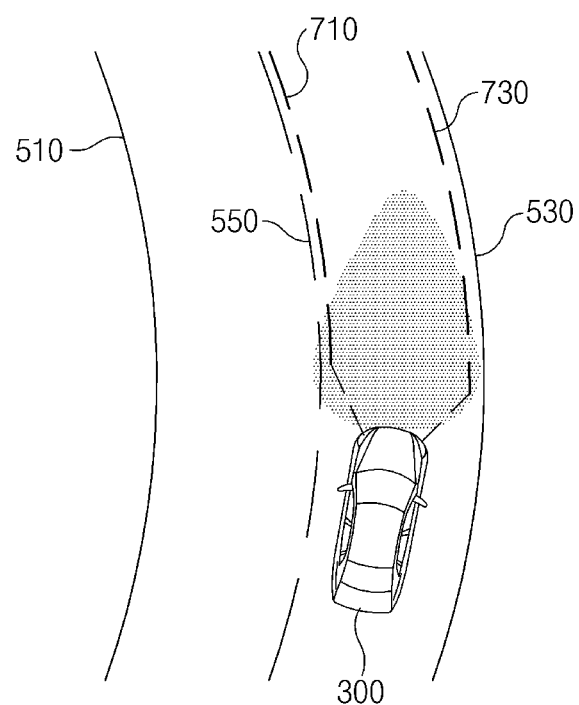

FIG. 1 is a block diagram illustrating a lamp system for traffic lane indication using a navigation link according to an embodiment of. FIGS. 2 and 3 are diagrams for describing a procedure for traffic lane indication by a lamp system for traffic lane indication using a navigation link, according to an embodiment. FIGS. 4 and 5 are diagrams for describing a procedure for displaying traffic lane indication on a HUD by a lamp system for traffic lane indication using a navigation link, according to an embodiment. FIGS. 6-8 are diagrams for describing a procedure for traffic lane indication after a lane change by a lamp system for traffic lane indication using a navigation link, according to an embodiment.

Referring to FIG. 1, according to an embodiment, a lamp system for traffic lane indication using a navigation link may include a multi-function sensor 110, a navigation device 130, a vehicle controller 150, a fog lamp 170, a line lamp 190, a display 210, and a warning device 230.

The multi-function sensor 110 may include a multi-function camera (MFC), a weather sensor, and the like. The MFC may capture a front of a host vehicle 300 being driven, and may use the captured image to detect a line (or lane). The weather sensor may detect a weather environment, such as whether there is fog in front of the host vehicle 300.

The navigation device 130 may determine a current location of the host vehicle 300 by receiving a navigation message transmitted by a GPS (Global Positioning System) satellite, may match the current location of the host vehicle 300 with map data to display the current location of the host vehicle 300 on a screen, may determine a driving route from the current location of the host vehicle 300 to a destination of the host vehicle 300, and may guide the host vehicle 300 to drive along the determined driving route. The navigation device 130 may receive geographic information of an area in which the host vehicle 300 is driving. The geographic information may be used as information for determining the direction of a driving lane in the corresponding area.

When fog is detected in front of the host vehicle 300, the fog lamp 170 may be turned on to improve a driver's visibility in such poor visibility conditions.

The line lamp 190 may generate and output a prediction line at a location corresponding to a line of a road. The line lamp 190 may use a laser light source capable of condensing light.

When the vehicle controller 150 detects fog through a weather sensor of the multi-function sensor 110, the vehicle controller 150 may turn on the fog lamp 170, may analyze a front image captured through MFC to detect a line, may analyze line information (curvature/size), may improve the accuracy of the location information of the host vehicle 300 in conjunction with the navigation device 130, and may predict the forward line.

That is, the navigation device 130 may identify the number of lanes on a road, on which the host vehicle 300 is currently located, based on GPS and the stored map information, and may transmit the number of lanes to the vehicle controller 150. The vehicle controller 150 may detect lane information from image data captured from the MFC, may predict a forward line based on the number of lanes on a road, which is obtained by the navigation device 130, and may extract the current location line of the host vehicle 300 (i.e., where the host vehicle 300 is positioned within a particular lane of the road).

The vehicle controller 150 may predict a forward line, may drive the line lamp 190, and may control the line lamp 190 to output a prediction line to follow a predicted forward line.

For example, referring to FIG. 2, on a one-way road having two lanes where a left boundary line 510 on the left, the right boundary line 530 on the right, and a dividing line 550 (e.g., two closely spaced parallel lines) dividing first and second lanes at the center are formed, when the left boundary line 510 or the dividing line 550 is not properly viewable due to bad weather such as fog while the host vehicle 300 is driving on the first lane between the left boundary line 510 and the dividing line 550, the vehicle controller 150 may extract a line from an image captured by the MFC to process the image, and may extract the left boundary line 510 and the dividing line 550 to predict the forward line. The vehicle controller 150 may control the line lamp 190 to output a prediction line to follow the predicted forward line.

Accordingly, referring to FIG. 3, the line lamp 190 may output a left prediction line 710 to a location where the left boundary line 510 is located, and may output a right prediction line 730 to a location where the dividing line 550 is located. Even when the left boundary line 510 or the dividing line 550 is not viewable due to bad weather such as fog, the host vehicle 300 may drive between the left prediction line 710 and the right prediction line 730 to thereby stay within the lane that the host vehicle is currently driving in even under poor visibility conditions.

Meanwhile, when there is a vehicle approaching the host vehicle from another lane adjacent to the lane that the host vehicle is driving in, or when there is a vehicle in front of the host vehicle that is in the same lane as the host vehicle and that is driving in the same direction as the host vehicle during a high beam operation of the host vehicle 300 in conjunction with adaptive driving beam (ADB), the vehicle controller 150 may mask a portion of these other vehicles and may allow only a portion of the prediction line to be output.

Besides, the vehicle controller 150 may capture the prediction line in front of the host vehicle 300 through the MFC, may analyze a location of the host vehicle 300 within a lane through the captured prediction line, and may display the prediction line and the location of the host vehicle 300 in real time on the display 210 provided in the host vehicle 300.

Referring to FIG. 4, the display 210 may be a HUD that projects and displays prediction line information on a front window of the host vehicle 300 in augmented reality (AR). The left prediction line 710 and the right prediction line 730 captured through the MFC may be displayed on the HUD. The location of the host vehicle 300 may be displayed in real time between the left prediction line 710 and the right prediction line 730.

In other words, the vehicle controller 150 may link information (direction information) of the navigation device 130 with the current location of the host vehicle 300. The vehicle controller 150 may calculate the prediction line and the location of the host vehicle 300 by matching the prediction line captured through the MFC and navigation information, and may provide an accurate guide by displaying the prediction line and the location of the host vehicle 300 on the HUD in AR.

Referring to FIG. 5, when lane departure occurs on the HUD while the host vehicle 300 contacts the left prediction line 710 or the right prediction line 730, the vehicle controller 150 may warn a driver of lane departure through the warning device 230.

The warning device 230 may be a speaker, a lighting device, or the like provided inside the host vehicle 300. The vehicle controller 150 may allow the driver to drive safely by warning the driver of the lane departure of the host vehicle 300 through a buzzer, a warning light, and the like.

As described above, when the prediction line according to an embodiment is displayed through the HUD of the host vehicle 300 and, at the same time with, is output to a road surface in front of the host vehicle 300, the driver may drive a vehicle safely by recognizing lines clearly in bad weather such as a case where it is difficult to recognize lines due to spray caused by surrounding vehicles in rainy conditions, a case where it is difficult to recognize driving lanes because the lanes are covered with snow on a road, a case where it is difficult to recognize lanes in front of the vehicle because the field of view is narrowed due to fog or the like.

In the meantime, referring to FIG. 6, the lane of the host vehicle 300 may be changed from the first lane to the second lane while the host vehicle 300 is driving forward in a state where the host vehicle 300 turns on the fog lamp 170 while the left prediction line 710 is output toward the left boundary line 510 and the right prediction line 730 is output toward the dividing line 550. Alternatively, referring to FIG. 7, the host vehicle 300 moves away from the left boundary line 510 while moving to the right toward the second lane. In this case, the left prediction line 710 that has been output to the left boundary line 510 is turned off, and only the right prediction line 730 that has been output to the dividing line 550 is turned on.

Next, referring to FIG. 8, when the host vehicle 300 moves further to the right and is located at the center of the second lane, the right prediction line 730 that has been output toward the dividing line 550 may be output toward the right boundary line 530. The left prediction line 710 that has been turned off may be turned on and may be output toward the dividing line 550.

Figure 9:
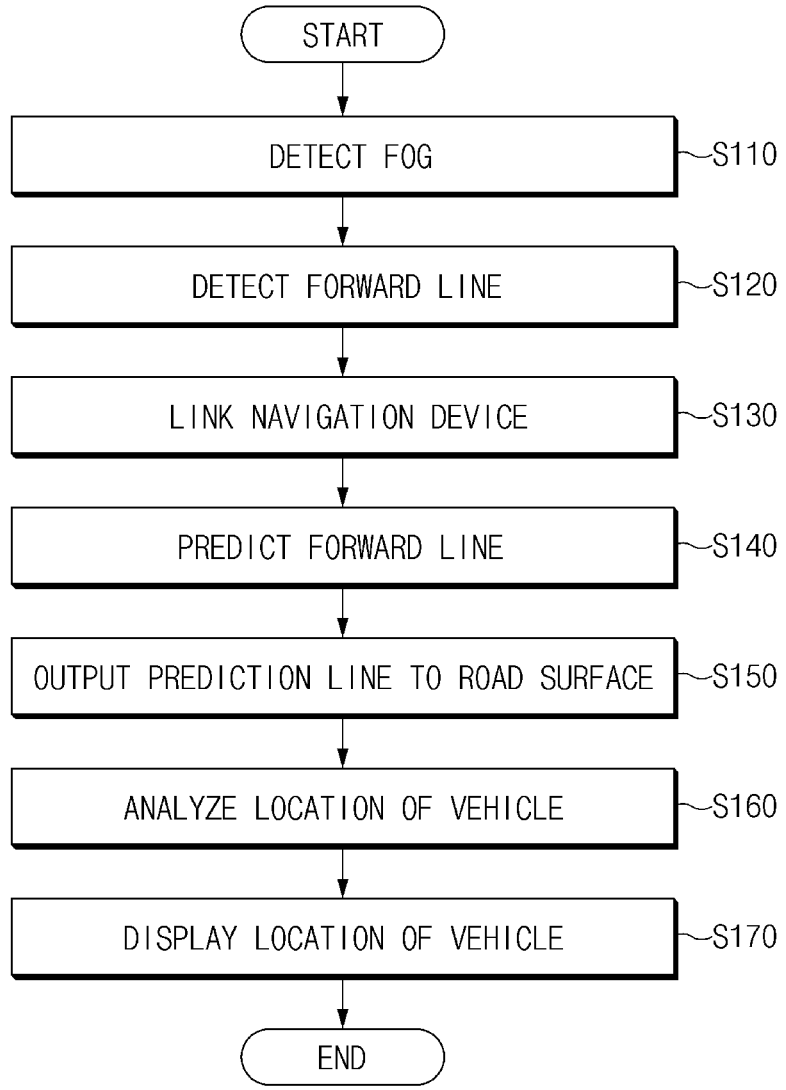
FIG. 9 is a flowchart for describing a method for traffic lane indication by a lamp system for traffic lane indication using a navigation link, according to an embodiment.

Hereinafter, according to another embodiment, a lamp system for traffic lane indication using a navigation link and a method for traffic lane indication thereof will be described in detail with reference to FIG. 5. FIG. 9 is a flowchart for describing a method for traffic lane indication by a lamp system for traffic lane indication using a navigation link, according to an embodiment.

Hereinafter, it is assumed that a lamp system for traffic lane indication using a navigation link in FIG. 1 performs a process of FIG. 9.

First of all, when fog is detected through the weather sensor of the multi-function sensor 110, the vehicle controller 150 may control the fog lamp 170 to be turned on (S110), may receive forward line information through the MFC of the multi-function sensor 110 (S120), and may receive location information of the host vehicle 300 through the navigation device 130 (S130).

Next, the vehicle controller 150 may analyze the curvature or size of a line captured through the multi-function sensor 110, and may predict the forward line through the location information of the host vehicle 300 by the navigation device 130 (S140).

Next, the vehicle controller 150 may control the line lamp 190 to output the prediction line to follow the predicted forward line on a road surface (S150). At this time, when there is another vehicle moving towards the host vehicle in an opposite direction with respect to a direction in which the host vehicle is moving (an opposite vehicle), or when there is another vehicle in front of the host vehicle that is moving in the same direction as the host vehicle (a preceding vehicle), the vehicle controller 150 may output only the line lamp 190 and not output the left prediction line 710 and/or the right prediction line 730.

Next, the vehicle controller 150 may analyze the location of the host vehicle 300 after capturing a prediction line through the MFC of the multi-function sensor 110 (S160), and may display the prediction line and the location of the host vehicle 300 on the display 210 (S170).

Next, when the host vehicle 300 displayed in real time on the display 210 deviates from the prediction line displayed on the display 210, the vehicle controller 150 may warn the driver through the warning device 230.

As described above, according to a lamp system for traffic lane indication using a navigation link and a method for traffic lane indication thereof, the present technology may identify a location of a line through a fog-free lamp irradiating an actual line on a road surface to lower the risk of an accident and to secure safety while a vehicle is driving in bad weather conditions such as when there is fog or heavy rain, may allow a driver to detect lane departure through a real-time vehicle location displayed on a HUD by analyzing data of the line irradiated on the road surface when a host vehicle deviates from a lane, and may provide the driver with a sense of safety by displaying an accurate location of the host vehicle even in foggy conditions.

The present technology may identify a location of a line through a fog-free lamp irradiating an actual line on a road surface to lower the risk of an accident and to secure safety while a vehicle is driving in bad weather such as fog or heavy rain, may allow a driver to detect lane departure through a real-time vehicle location displayed on a HUD by analyzing data of the line irradiated on the road surface when a host vehicle deviates from a line, and may provide the driver with a sense of safety by displaying an accurate location of the host vehicle even in foggy conditions.

Hereinabove, although the present disclosure has been described with reference to exemplary embodiments and the accompanying drawings, the present disclosure is not limited thereto, but may be variously modified and altered by those skilled in the art to which the present disclosure pertains without departing from the scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A lamp system for traffic lane indication using a navigation link, the lamp system comprising:
   a multi-function sensor configured to sense an environment and a line on road surface in front of a host vehicle;
   a line lamp configured to generate and output a prediction line at a location corresponding to the line of the road surface;
   a navigation device configured to provide location information of the host vehicle; and
   a vehicle controller configured to:
   predict a forward line based on the line sensed by the multi-function sensor and the location information of the host vehicle provided by the navigation device;
   control the line lamp to output the prediction line to follow the predicted forward line;
   analyze the location information of the host vehicle after capturing the prediction line through the multi-function sensor; and
   display the prediction line and a location of the host vehicle on a display of the host vehicle,
   wherein the vehicle controller controls the line lamp not to output the prediction line when there is another vehicle that is moving in an opposite direction than a direction in which the host vehicle is moving, or when there is another vehicle that is in front of the host vehicle and is moving in a same direction in which the host vehicle is moving.

2. The lamp system of claim 1, wherein the vehicle controller controls a fog lamp to be turned on when fog is detected through the multi-function sensor.

3. The lamp system of claim 1, wherein the vehicle controller predicts the forward line by analyzing a curvature or a size of the line captured through the multi-function sensor.

4. The lamp system of claim 1, wherein the vehicle controller is configured to cause the prediction line and the location of the host vehicle to be displayed through a head-up display (HUD) in real time.

5. The lamp system of claim 4, wherein the vehicle controller warns a driver through a warning device when the location of the host vehicle displayed on the HUD in real time deviates from the prediction line displayed on the HUD by at least a predetermined deviation amount.

6. The lamp system of claim 1, wherein the line lamp includes a light source capable of condensing light.

7. A method for traffic lane indication by a lamp system of a host vehicle for traffic lane indication using a navigation link, the method comprising:
- receiving, by a vehicle controller of the host vehicle, forward line information through a multi-function sensor sensing an environment and a line on a road surface in front of the host vehicle;
- receiving, by the vehicle controller, location information of the host vehicle through a navigation device;
- predicting, by the vehicle controller, a forward line based on a line sensed by the multi-function sensor and the location information of the host vehicle provided by the navigation device;
- controlling, by the vehicle controller, a line lamp to output a prediction line to follow the predicted forward line,
- analyzing, by the vehicle controller, the location information of the host vehicle after capturing the prediction line through the multi-function sensor; and
- displaying, by the vehicle controller, the prediction line and a location of the host vehicle on a display of the host vehicle,
- wherein the controlling of the line lamp includes: controlling only the line lamp not to output the prediction line when there is another vehicle that is moving in an opposite direction than a direction in which the host vehicle is moving, or when there is another vehicle that is in front of the host vehicle and is moving in a same direction in which the host vehicle is moving.

8. The method of claim 7, wherein the receiving of the forward line information includes: controlling, by the vehicle controller, a fog lamp to be turned on when fog is detected through the multi-function sensor.

9. The method of claim 7, wherein the predicting of the forward line includes: predicting, by the vehicle controller, the forward line by analyzing a curvature or a size of the line captured through the multi-function sensor.

10. The method of claim 7, further comprising:
after the controlling of the line lamp,
- detecting, by the vehicle controller, the prediction line through the multi-function sensor and analyzing, by the vehicle controller, the location of the host vehicle based on the detected prediction line; and
- displaying, by the vehicle controller, the location of the host vehicle on a head-up display (HUD).

11. The method of claim 10, further comprising: after the controlling of the line lamp, warning, by the vehicle controller, a driver through a warning device when the location of the host vehicle displayed on the HUD in real time deviates from the prediction line displayed on the HUD by at least a predetermined deviation amount.

12. The method of claim 11, wherein the line lamp includes a light source capable of condensing light.

13. A lamp system for providing an optimal vehicle path indication, the lamp system comprising:
- a multi-function sensor to sense an environment and a path on road surface directly in front of a host vehicle on which the host path is set to travel on;
- a line lamp to generate and output a prediction line at a location corresponding to the path on the road surface;
- a location information device to provide location information of the host vehicle; and
- a vehicle controller configured to:
- predict a forward line based on the line sensed by the multi-function sensor and the location information of the host vehicle provided by the location information device;
- control the line lamp to output the prediction line to follow the predicted forward line,
- analyze the location information of the host vehicle after capturing the prediction line through the multi-function sensor; and
- display the prediction line and a location of the host vehicle on a display of the host vehicle,
- wherein the vehicle controller controls the line lamp not to output the prediction line when there is another vehicle that is moving in an opposite direction than a direction in which the host vehicle is moving, or when there is another vehicle in front of the host vehicle that is Moving in a same direction in which the host vehicle is moving.

14. The lamp system of claim 13, wherein the vehicle controller controls a fog lamp to be turned on when fog is detected through the multi-function sensor.

15. The lamp system of claim 13, wherein the vehicle controller predicts the forward line by analyzing a curvature or a size of the line sensed by the multi-function sensor.

16. The lamp system of claim 13, wherein the vehicle controller is configured to cause the prediction line and the location of the host vehicle to be displayed through a head-up display (HUD) in real time.

17. The lamp system of claim 13, wherein the line lamp includes a light source capable of condensing light.

* * * * *